United States Patent [19]

Miyagi et al.

[11] 4,381,746

[45] May 3, 1983

[54] METHOD OF CONTROLLING THE ROTATIONAL SPEED OF AN INTERNAL COMBUSTION ENGINE

[75] Inventors: Hideo Miyagi, Toyota; Jiro Nakano, Okazaki, both of Japan

[73] Assignee: Toyota Jidosha Kabushiki Kaisha, Toyota, Japan

[21] Appl. No.: 231,397

[22] Filed: Feb. 4, 1981

Related U.S. Application Data

[63] Continuation of Ser. No. 44,407, Jun. 1, 1979.

[30] Foreign Application Priority Data

Jun. 17, 1978 [JP] Japan ................................. 52-72725

[51] Int. Cl.³ ........................ F02M 1/00; G06F 15/20; F02D 31/00; F02D 1/04

[52] U.S. Cl. ................................ 123/339; 123/179 G; 123/358

[58] Field of Search ............... 123/339, 340, 352, 358, 123/360, 361, 362, 585, 588, 179 G, 179 L

[56] References Cited

U.S. PATENT DOCUMENTS

| | | | |
|---|---|---|---|
| 3,964,457 | 6/1976 | Coscia | 123/179 L |
| 4,177,516 | 12/1979 | Mason | 123/358 |
| 4,181,104 | 1/1980 | Shinoda | 123/179 G |

*Primary Examiner*—Raymond A. Nelli
*Attorney, Agent, or Firm*—Kenyon & Kenyon

[57] ABSTRACT

The flow rate of intake air sucked into an internal combustion engine when a throttle valve of the engine is at the idling position is controlled so that the actual rotational speed of the engine becomes equal to a desired rotational speed of the engine. This desired rotational speed of the engine is determined by a predetermined calculation, in accordances with the warming-up state of the engine.

5 Claims, 7 Drawing Figures

METHOD OF CONTROLLING THE ROTATIONAL SPEED OF AN INTERNAL COMBUSTION ENGINE

This is a continuation of application Ser. No. 044,407 filed June 1, 1979.

BACKGROUND OF THE INVENTION

The present invention relates to a method of controlling the rotational speed of an internal combustion engine in the idling condition or the decelerating condition.

There is known a method of controlling the rotational speed of an internal combustion engine in the idling condition or the decelerating condition, which involves controlling the flow rate of intake air drawn into the engine when the engine is in the idling condition or the decelerating condition, namely, when a throttle valve disposed in an intake passage of the engine is at the idling position. According to this conventional method, the flow rate of intake air is controlled by adjusting the cross-sectional area of a flow passage or the opening time period of a flow passage by means of a control valve disposed in a bypass passage, which connects a region of the intake passage at a position located upstream of the throttle valve to a region of the intake passage at a position located downstream of the throttle valve.

The control valve is adjusted in accordance with a feedback signal indicating the difference between the detected actual rotational speed of the engine and a desired rotational speed in the idling condition. This feedback control operation of the flow rate of intake air is carried out not only in the idling condition or the decelerating condition of the engine but also in the ordinary driving condition of the engine. A variable range of either the cross-sectional area of the flow passage or, in the case of a cyclically opened and closed flow passage, the time period of each cycle during which the flow passage is opened is ordinarily predetermined. This permits the flow rate of air flowing through the bypass passage to be controlled corresponding to a value within the predetermined variable range of the cross-sectional area or the opening time period of the flow passage irrespective of a difference between the actual rotational speed of the engine and the above-mentioned desired value of the rotational speed.

Generally, when the temperature in an internal combustion engine is low, for example, in the case of the warming-up operation, since the atomization or gasification of the air-fuel mixture is not sufficient and the viscosity of the engine oil is high, driving at idling speed cannot be performed in a stable manner. Therefore, when the engine temperature is lower than a predetermined level, conventional internal combustion engines, are controlled so that the idling rotational speed is forcibly increased by a certain value. This technique is called fast idle control. However, according to this fast idle control, when the engine temperature is lower than a certain value, the rotational speed is increased indiscriminately, which has the disadvantage that an optimum idling rotational speed corresponding to the actual temperature of the engine is not attained.

Furthermore, in the conventional method for controlling the rotational speed of the engine, since the upper limit and lower limit values of the flow rate of intake air to be controlled by controlling the cross-sectional area or the opening time period of the flow passage are always constant irrespective of the engine temperature, following problems are encountered. One is that when the engine temperature is low, the rotational resistance of the engine is high. Accordingly, it is necessary to take in air in a much larger quantity than when the temperature of the engine is high. Contrary to this, in the case where the engine temperature is high and the variable range of the flow rate of air taken in is large, when the engine is decelerated from a low rotational speed that is much lower than the desired rotational speed, the control valve disposed in the bypass passage is controlled to be fully opened. If the load on the engine is abruptly decreased in this state, the rotational speed of the engine can be abruptly increased drastically, and therefore, a very dangerous driving state can occur.

SUMMARY OF THE INVENTION

It is, therefore, an object of the present invention to provide a method of suitably controlling the rotational speed of an internal combustion engine when a throttle valve of the engine is at the idling position.

According to the present invention, a method of controlling the rotational speed of an internal combustion engine is provided. This method includes the step of generating a rotational speed signal having a value corresponding to the actual rotational speed of the engine, when a throttle valve of the engine is at the idling position. In addition, a temperature signal which indicates the warming-up state of the engine is generated, as well as a reference signal having a value corresponding to a desired rotational speed of the engine. The reference signal is based on a predetermined function describing a relationship between the desired rotational speed of the engine and the warming-up state of the engine. The flow rate of intake air drawn into the engine when the throttle valve is at the idling position is controlled so that the value of above-mentioned rotational speed signal becomes equal to the above-mentioned calculated value.

The above and other related objects and features of the present invention will become more apparent from the description set forth below, with reference to the accompanying drawings, and from the appended claims.

DETAILED DESCRIPTION OF THE PREFERRED EMBODIMENTS

Figure 1:
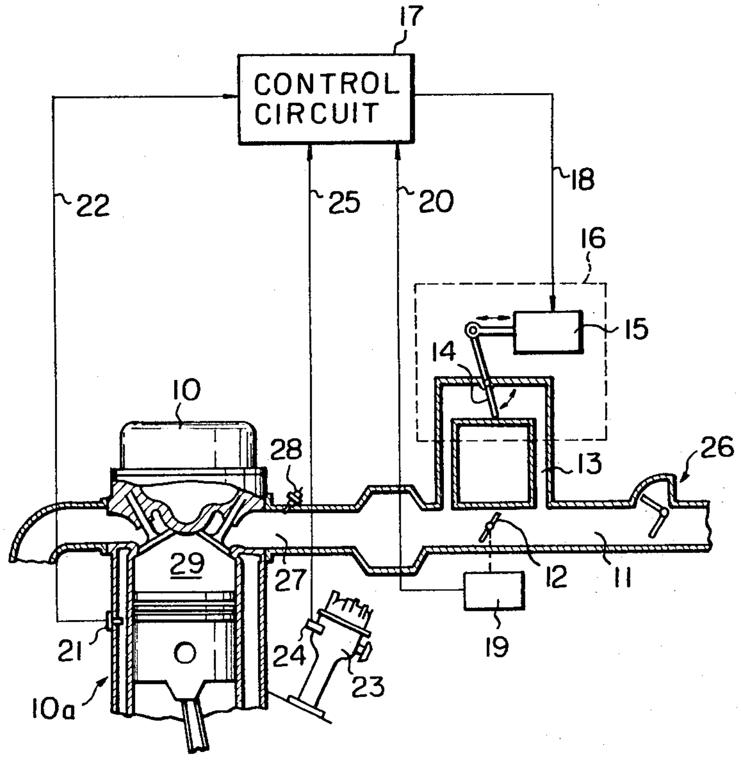
FIG. 1 is a schematic diagram illustrating an embodiment of the present invention.

Referring to FIG. 1, which is a schematic diagram illustrating an electronic control fuel injection type internal combustion engine according to the present invention, reference numeral 10 denotes an engine body, and reference numeral 11 denotes an intake passage of the engine. A throttle valve 12 is disposed in the intake passage 11. A bypass passage 13 is disposed to connect a region of the intake passage located upstream of the throttle valve 12 with a region of the intake passage at a position located downstream of the throttle valve 12. A control valve 14 is disposed in the bypass passage 13 for controlling the flow passage of the bypass passage 13. An actuator 15 is operatively connected to the control valve 14 to provide a flow rate control mechanism 16 which is energized by a driving signal fed from a control circuit 17 via a line 18.

Various structures other than that illustrated in FIG. 1 may be adopted for the flow rate control mechanism 16. These structures will be described hereinafter with reference to FIGS. 6 and 7.

Referring again to FIG. 1, a throttle position sensor 19 is attached to the shaft of the throttle valve 12 to detect when the throttle valve 12 is at the idling position, and a detected signal of the throttle position sensor 19 is fed to the control circuit 17 via a line 20. A water temperature sensor 21 is mounted on a cylinder block 10*a* of the engine to detect the temperature of engine coolant, and a temperature signal of the sensor 21 is fed to the control circuit 17 via a line 22.

A speed sensor 24 for generating a digital signal indicating the actual rotational speed of the engine from an ignition signal is disposed on a distributor 23 of the engine, and the digital speed signal of the sensor 24 is fed to the control circuit 17 via a line 25.

As is well known, in an electronic control fuel injection type internal combustion engine, the flow rate of intake air drawn into the engine is detected by an air flow sensor 26 disposed in the intake passage 11, and fuel is supplied in an amount in accordance with the detected flow rate of intake air into a combustion chamber 29 of the engine from a fuel injection valve 28 mounted in an intake manifold portion 27. Accordingly, the rotational speed of the engine can be controlled by controlling the flow rate of intake air by the throttle valve 12 and/or control valve 14.

Figure 2:
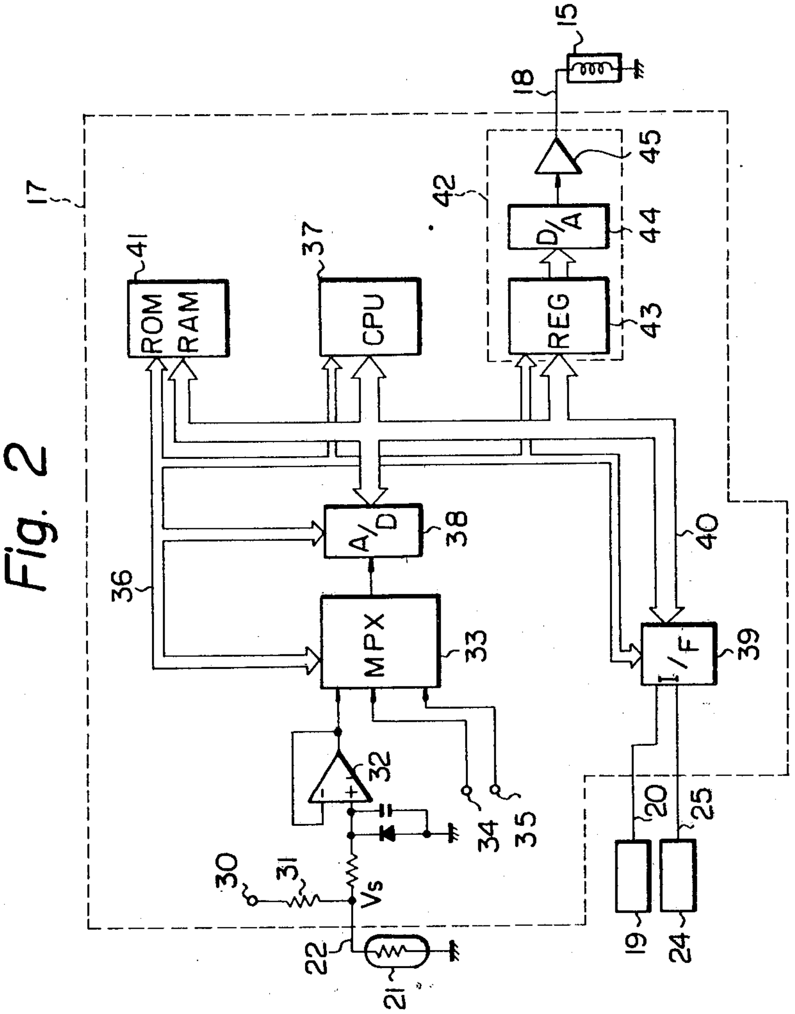
FIG. 2 is a block diagram illustrating a control circuit in the embodiment of FIG. 1.

FIG. 2 is a block diagram of the control circuit 17 in FIG. 1. In this embodiment, a stored program type digital computer is used in the control circuit 17. The water temperature sensor 21 is a temperature-sensitive resistance element, for example, a thermistor, and a certain standard voltage is applied to a terminal 30. Accordingly, a voltage determined by the division ratio between the resistance value of a resistor 31 and the resistance value across the terminals of the sensor (thermistor) 21 to this standard voltage is applied as an engine temperature signal $V_S$ to an analog multiplexer 33 (MPX) via a buffer amplifier 32. Various analog signals indicating the driving conditions of the engine are applied to the analog multiplexer 33 via terminals 34 and 35. These analog signals including the temperature signal $V_S$ are supplied in the time-division manner, to an analog-to-digital converter 38 (A/D) in response to control signals from a central processing unit 37 (CPU) via a control bus 36, and then the analog signals are converted to digital signals.

The detected signal of the throttle position sensor 19, that is, a signal indicating that the throttle valve is at the idling position, which causes the engine to be in the idling condition or in the decelerating condition, is applied to an input interface circuit 38 (I/F) via the line 20. A digital speed signal indicating the actual rotational speed of the engine, which is fed from the speed sensor 24, is applied to the input interface circuit 39 via the line 25.

In FIG. 2, reference numeral 40 denotes an address and data bus and reference numeral 41 denotes a memory composed of ROM and RAM, in which data or approximate equations of the desired rotational speed as a function of engine temperature and the upper limit and lower limit values of the control output signal as functions of the engine temperature and corresponding to the flow rate of intake air to be controlled are preliminarily stored along with a control program. Furthermore, in FIG. 2, reference numeral 42 denotes an output interface circuit which includes an output register 43 (REG) receiving control output data via the data bus 40, a digital-analog converter 44 (D/A) performing digital-analog conversion of control output data and an amplifier 45 for amplifying analog control signals from converter 44. The output of the amplifier 45, that is, a driving signal, is applied to the above-mentioned actuator 15 via the line 18 to energize the actuator 15.

Operations of the control circuit 17 will now be described by reference to FIG. 2 and the flow chart of FIG. 3. Main flows of the control program stored in the memory 41 are diagrammatically illustrated in FIG. 3, and the control circuit 17, that is, the computer, operates as follows.

When a signal indicating that the engine is in the idling or decelerating condition is applied from the throttle position sensor 19, the CPU 37 instructs selection of a channel of the temperature signal $V_S$ to the analog multiplexer 33 at a point 50. Then the CPU instructs start of A/D conversion of the temperature signal $V_S$ to the A/D converter 38 at a point 51. The digital temperature signal $V_{SD}$ is taken into the CPU via the data bus 40 (point 52).

Figure 4:
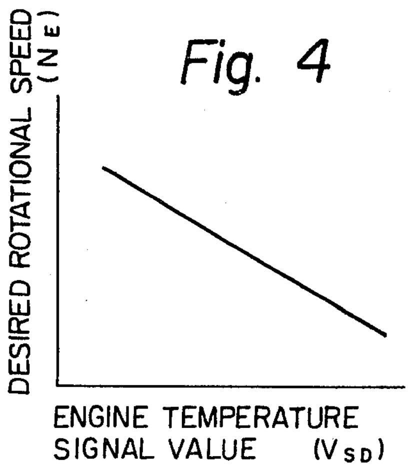
FIG. 4 is a graph with the desired rotational speed of the engine versus the value of engine temperature signal plotted thereon.
Figure 5:
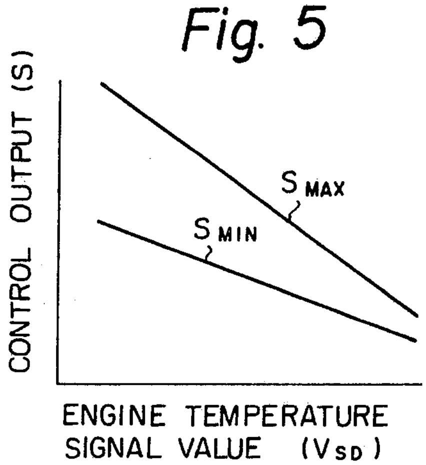
FIG. 5 is a graph with the value of a control output versus the value of an engine temperature signal plotted thereon.

A specific relation between the value of the temperature signal $V_{SD}$ and a desired rotational speed $N_E$, as shown in FIG. 4 is already stored in the memory 41. Furthermore, specific relations of an upper limit value $S_{MAX}$ and a lower limit value $S_{MIN}$ of the above-mentioned control output to the value of the temperature signal $V_{SD}$, as shown in FIG. 5, are also already stored in the memory 41. As the method for storing these specific relations in the memory 41, there may be considered, for example, in case of the relation between the temperature signal $V_{SD}$ and the desired rotational speed $N_E$, a mapping method in which values of $V_{SD}$ are directly used as addresses and corresponding values of $N_E$ are stored one by one, or a method in which the relation between $V_{SD}$ and $N_E$ is expressed as an approximate equation and the approximate equation is stored.

Figure 3:
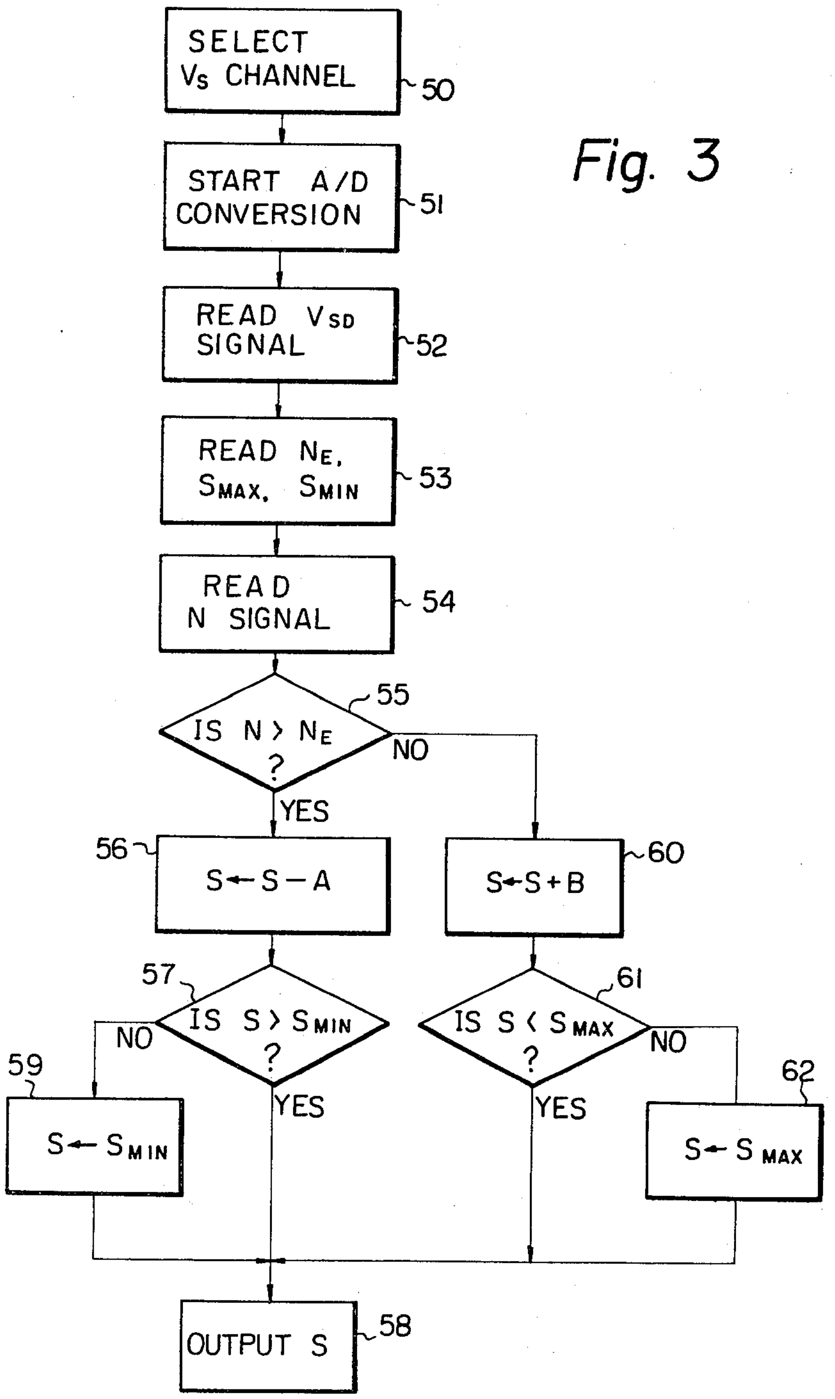
FIG. 3 is a flow chart illustrating operations of the control circuit of FIG. 2.

At a point 53 of FIG. 3, CPU 37 is able to take out from the memory 41 the desired rotational speed $N_E$ corresponding to the obtained temperature signal $V_{SD}$ and the upper limit value $S^{MAX}$ and lower, limit value $S_{MIN}$ of the control output corresponding to the flow rate of intake air to be controlled. Then, at a point 54, the actual rotational speed N of the engine is taken into the CPU 37 and at a point 55, the actual rotational speed N is compared with the desired rotational speed $N_E$. If $N > N_e$, the operation flow advances to a point 56 and the control output S is reduced by a predetermined quantity A. At a point 57, the reduced control output S is compared with the lower limit value $S_{MIN}$, and if $S > S_{MIN}$, the operation flow proceeds to a point 58, and the control output S is fed to the output interface circuit 42. If $S \leqq S_{MIN}$, the control output S is made equal to the lower limit value $S_{MIN}$ at a point 59 and the operation flow then proceeds to the point 58.

If $N \leqq N_E$ at the point 55, the operation flow proceeds to a point 60, the control output S is increased by a predetermined quantity B, and at a point 61 the increased control output S is compared with the upper limit value $S_{MAX}$. If $S < S_{MAX}$, the operation flow proceeds to the point 58 and the control output S is fed to the output interface circuit 42. If $S \geqq S_{MAX}$, the control output S is made equal to the maximum value $S_{MAX}$ at a point 62, and the operation flow proceeds to the point 58.

The control output S applied to the output interface circuit 42 is D/A converted to produce a driving signal having a voltage value corresponding to the value of the control output, and the driving signal is applied to the actuator 15. The actuator 15 controls the opening degree of the control valve 14 according to the voltage value of the applied driving signal. Thus, the flow rate of air passing through the bypass passage 13 and fed to the combustion chamber 29 corresponds to the value of the control output S.

THe above-mentioned control procedures are repeated at uniform time intervals whereby the rotational speed in the idling or decelerating condition of the engine is controlled so as to be at a level optimum to the engine temperature. More specifically, as shown in FIG. 4, when the engine temperature is low, the rotational speed is controlled so as to be at a relatively high level, and as the engine temperature becomes high, for example, as warming-up of the engine progresses, the rotational speed is gradually controlled so as to be at a low level. Thus, the rotational speed can be controlled so as to be at a level optimum to the actual engine temperature.

While the above-mentioned control of the rotational speed is carried out, the upper limit and lower limit values of the flow rate of air passing through the bypass passage 13 are controlled so that they are increased when the engine temperature is low and are reduced as the engine temperature is elevated, as shown in FIG. 5. Accordingly, the occurrence of such troubles as stalling of the engine can be prevented even when the engine temperature is low. Moreover, an abrupt increase of the rotational speed, which can easily occur if the load is quickly reduced to zero when the engine temperature is high, can be effectively prevented.

Other examples of the flow rate control mechanism 16 described in the above embodiment will now be described with reference to FIGS. 6 and 7.

Figure 6:
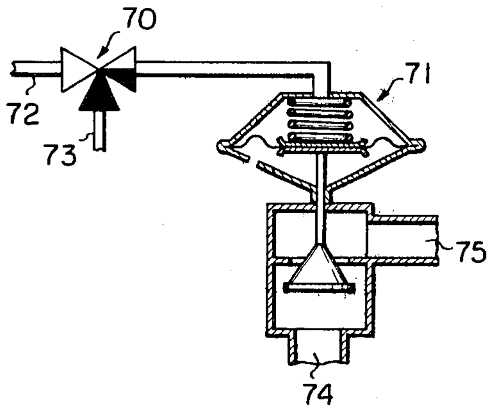
FIGS. 6 and 7 are schematic diagrams, each illustrating an alternative example of the structure of flow rate control mechanism, respectively.

In FIG. 6, reference numeral 70 denotes an electromagnetic valve, and reference numeral 71 denotes a diaphragm type flow rate control valve. A port 72 of the electromagnetic valve 70 is open to the atmosphere, and a port 73 is communicated with the intake manifold of the engine. The electromagnetic valve 70 is arranged in such a manner that a pulse signal consisting of cyclically recurring pulses, the pulse in each cycle having a duty ratio determined according to the voltage value of the driving signal fed out from the output interface circuit 42 is applied thereto. More specifically, the electromagnetic valve 70 is switched on or off according to this pulse signal, and according to this on-off operation of the electromagnetic valve 70, a vacuum in the intake manifold is applied to a diaphragm chamber of the flow rate control valve 72 to control the flow rate of air passing through the ports 74 and 75.

Figure 7:
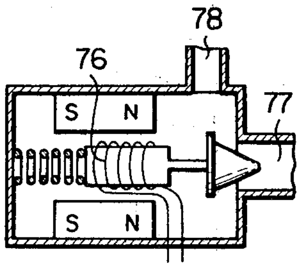

FIG. 7 illustrates a kind of an analog operation valve in which according to the value of an electric current applied to an exciting coil 76, which value corresponds to the value of the driving signal fed from the amplifier 45, the flow passage sectional areas of ports 77 and 78 are controlled to control the flow rate of air.

In the above-described embodiments, a signal of the temperature of engine coolant is used as the signal indicating the warming-up state of the engine. A signal of the temperature of engine oil or a signal of the temperature of exhaust gas may be used instead of the engine coolant temperature signal.

The relationship between the desired rotational speed and the engine temperature, and the relationship between the upper and lower limit values of the flow rate of sucked air passing through the bypass passage and the engine temperature are not limited to those shown in FIGS. 4 and 5.

As will be apparent from the foregoing illustrative description, according to the method of the present invention the desired rotational speed when the throttle valve is at the idling position is changed according to the warming-up state of the engine, and the upper limit and lower limit values of the flow rate of incoming air at the time of control are changed according to the warming-up state of the engine. Therefore, the rotational speed of the engine can be controlled so as to have an level optimum in relation to the actual state of the engine.

As many widely different embodiments of the present invention may be constructed without departing from the spirit and scope of the present invention, it will be understood that the present invention is not limited to the specific embodiments described in this specification, except as defined in the appended claims.

What is claimed is:

1. A method of controlling the idling rotational speed of an internal combustion engine having an intake passage and a throttle valve in the intake passage, said method comprising the steps of:

a. measuring the actual rotational speed of the engine and generating an actual speed signal corresponding thereto;

b. detecting the temperature of the engine and generating a temperature signal that has a value corresponding to the detected temperature;

c. generating, in response to the temperature signal, a reference speed signal having a value which is a function of the value of the temperature signal and which represents the desired idling rotational speed of the engine at the detected temperature;

d. comparing the actual speed signal to the reference speed signal and generating a control output signal that corresponds to the flow rate of air drawn through the intake passage into the engine;

e. restricting the value of the control output signal to be between upper and lower limits which are functions of the detected temperature of the engine; and f. controlling, in response to the restricted control output signal, the flow rate of air drawn into the engine through the intake passage to control the actual speed of the engine to reduce the magnitude of the difference between the actual speed signal and the reference speed signal.

2. The method of controlling the rotational speed of an internal combustion engine as claimed in claim 1 wherein the intake passage comprises a bypass passage that connects a first region of the intake passage upstream of the throttle valve with a second region of the intake passage downstream of the throttle valve, said step of controlling the flow rate of intake air drawn into the engine comprising controlling the cross-sectional area of the bypass passage.

3. The method of controlling the rotational speed of an internal combustion engine as claimed in claim 1 wherein the intake passage comprises a bypass passage which connects a first region of the intake passage upstream of the throttle valve with a second region of the intake passage downstream of the throttle valve, the step of controlling the flow rate of intake air drawn into the engine comprising the steps of:

a. repetitively opening and closing the bypass passage cyclically; and
b. controlling the ratio of the time the bypass passage is open in each cycle to the total time of that cycle.

4. The method of controlling the rotational speed of an internal combustion engine as claimed in claim 1 wherein the upper and lower limits are controlled so that they are increased when the engine temperature is low and are reduced as the engine temperature increases.

5. The method of controlling the rotational speed of an internal combustion engine as claimed in claim 1 comprising the steps of:

a. detecting when the throttle valve is in an idling position and generating an idling signal accordingly; and
b. repeatedly measuring the actual rotational speed of the engine, generating the actual speed signal until the throttle valve is shifted to a position other than the idling position, repeatedly comparing the actual speed signal with the reference speed signal to generate control output signal, and repeatedly restricting the value of the control output signal and controlling air drawn into the engine to continue to reduce the magnitude of the difference between the actual speed signal and the reference speed signal.

* * * * *

UNITED STATES PATENT AND TRADEMARK OFFICE

CERTIFICATE OF CORRECTION

PATENT NO. : 4,381,746

DATED : May 3, 1983

INVENTOR(S) : Hideo Miyagi, et al.

It is certified that error appears in the above—identified patent and that said Letters Patent is hereby corrected as shown below:

On the title page

Change the Name of the Assignee from:

"Toyota Jidosha Kabushiki Kaisha" to

--Toyota Jidosha Kogyo Kabushiki Kaisha--.

Signed and Sealed this

*Twenty-seventh* Day of *December 1983*

[SEAL]

*Attest:*

GERALD J. MOSSINGHOFF

*Attesting Officer* *Commissioner of Patents and Trademarks*